United States Patent [19]

Sakurai et al.

[11] 4,312,783

[45] Jan. 26, 1982

[54] CATALYST FOR POLYMERIZATION OF OLEFINS

[75] Inventors: Hisaya Sakurai; Masayoshi Miya; Katsuhiko Takaya; Haruyuki Yoneda, all of Kurashiki, Japan

[73] Assignee: Asahi Kasei Kogyo Kabushiki Kaisha, Osaka, Japan

[21] Appl. No.: 169,234

[22] Filed: Jul. 16, 1980

[30] Foreign Application Priority Data

Jul. 24, 1979 [JP] Japan .................................. 54-94060
Jul. 28, 1979 [JP] Japan .................................. 54-96571

[51] Int. Cl.$^3$ .............................................. C08F 4/64
[52] U.S. Cl. ............................ 252/429 B; 252/431 R; 526/142
[58] Field of Search ........................ 252/429 B, 431 R

[56] References Cited

U.S. PATENT DOCUMENTS 4,135,046 1/1979 Harris et al. ................. 252/431 R X
4,235,745 11/1980 Takahashi et al. ............... 252/429 B

FOREIGN PATENT DOCUMENTS 1235062 6/1971 United Kingdom ............ 252/431 R

Primary Examiner—Patrick Garvin
Attorney, Agent, or Firm—Sprung, Felfe, Horn, Lynch & Kramer

[57] ABSTRACT

A catalyst comprising (A) a solid catalyst component obtained by reacting a titanium compound having a hydrocarbyloxy group with an organoaluminum compound in the presence of an ether to give a liquid material or to give a solid titanium component (a) which is solubilized by addition of a tetravalent titanium halide with or without an ether without separation or after separation from the reaction mixture, and heat treating the liquid material at a temperature of 70° to 180° C. with or without addition of a tetravalent titanium halide, and (B) an organoaluminum compound is effective for polymerization or copolymerization of olefins with high stereoregularity and has high polymerization activity.

17 Claims, No Drawings

CATALYST FOR POLYMERIZATION OF OLEFINS

This invention relates to a catalyst having high activity and giving high stereoregularity for polymerization of olefins, and a process for polymerizing olefins by using said catalyst.

It has been found by Ziegler and Natta that stereoregular polymers are obtained by contacting olefins with catalyst systems comprising transition metal compounds of the groups IV to VI of the periodic table and organometallic compounds of the groups I to III metals of the periodic table. Today, a combined system of a titanium halide and an organoaluminum compound is used as industrial catalyst for producing isotactic polypropylene. But, when such a catalyst system is used, although isotactic polypropylene can be obtained in relatively high yield, polymerization activity per catalyst is low and it is necessary to add a step of removing a catalyst residue from the polypropylene produced.

In order to overcome such disadvantages of catalysts, there have been made various proposals, e.g., a process for obtaining violet titanium trichloride by reducing titanium tetrachloride with an organoaluminum compound, and the like and then aging at a temperature of 150° to 200° C. (Japanese Patent Appln Kokoku (Post-Exam Publn) No. 8768/71), a process comprising treating β form titanium trichloride with titanium tetrachloride (Japanese Patent Appln Kokai (Laid-Open) No. 3717/71), a process comprising treating β form titanium trichloride with a complex forming agent followed by titanium tetrachloride (Japanese Patent Appln Kokai (Laid-Open) No. 34478/72), a process comprising adding titanium tetrachloride to a reaction product of an aluminum alkyl and an organic magnesium complex followed by heat treatment thereof (Japanese Patent Appln Kokai (Laid-Open) No. 37082/72), a process comprising reducing titanium tetrachloride with an organoaluminum compound to give β form titanium trichloride, which is treated with a complex forming agent followed by treatment with a monoalkyl dihalide or titanium tetrachloride (Japanese Patent Appln Kokai (Laid-Open) Nos. 74594/75 and 138082/75), a process comprising reacting titanium tetrachloride with a dialkylaluminum monochloride, and heat treating in the presence of an ether, followed by treatment with an alkylaluminum halide (Japanese Patent Appln Kokai (Laid-Open) No. 124892/75), a process comprising treating solid titanium trichloride with an ether to form a uniform liquid material and adding a liberating agent to give violet titanium trichloride (Japanese Patent Appln Kokai (Laid-Open) No. 16297/76), and the like. But polymerization activity and stereoregularity of polypropylene produced are still insufficient.

The present inventors have studied extensively on titanium compounds having C-O-Ti bonds as a component of catalyst and found that a mixed catalyst system comprising a novel solid catalyst component having C-O-Ti bond obtained by heat treating a liquid material prepared by reacting hydrocarbyloxy titanium compound, an organoaluminum compound, ether and a tetravalent compound and an organoaluminum compound was very effective for polymerization of α-olefins in that the polymer produced had high stereoregularity and polymerization activity in terms of yielded amount of polymer per gram of titanium was also large, and thus this invention was accomplished.

This invention provides a catalyst for polymerization of olefins comprising (A) a solid catalyst component obtained by reacting a titanium compound with an organoaluminum compound in the presence of an ether followed by heat treatment and (B) an organoaluminum compound, characterized in that said solid catalyst component has hydrocarbyloxy group and is obtained by reacting a titanium compound of the formula:

$$Ti(OR^1)_s X_{4-s} \quad (I)$$

wherein $R^1$ is a hydrocarbon residue having 1 to 20 carbon atoms; X is a halogen atom; and s is a figure of $0 < s \leq 4$, with an organoaluminum compound of the formula:

$$AlR^2_t Y_{3-t} \quad (II)$$

wherein $R^2$ is a hydrocarbon residue having 1 to 20 carbon atoms; Y is a halogen atom; and t is a figure of $0 < t \leq 3$, in the presence of an ether to give a liquid material containing substantially no solid, or to give a solid titanium component (a), which is changed to a liquid material by adding a tetravalent titanium halide or which is separated from the reaction mixture and then a tetravalent titanium halide and an ether are added thereto to give a liquid material, and heat treating said liquid material at a temperature of 70° to 180° C. with addition of a tetravalent titanium halide or without addition of a tetravalent titanium halide to give the solid catalyst component.

This invention also provides a process for producing olefin polymers and copolymers by using said catalyst system.

One of the features of this invention is that the polymers or copolymers obtained by using the special catalyst system has very high stereoregularity. As shown in Example 1, extraction residue with boiling n-heptane of 97.8% can easily be attained.

Another feature of this invention is that polymerization activity of the catalyst is high and a yielded amount per solid catalyst component or per titanium is very large. For example, in Example 8, a titanium content of the polypropylene obtained is 11 ppm. This means that it is possible to conduct the process with no deashing process, i.e. no process of removing catalyst residue being necessary, and further this suggests that it is possible to conduct the process with no deashing and no extraction processes.

A still further feature of this invention is that when the molecular weight is regulated by using hydrogen at the time of polymerization, the catalyst system of this invention shows most desirable properties as industrial catalyst that polymerization activity is increased and the polymer obtained maintains a high level of stereoregularity.

Individual catalyst components (A) the solid catalyst component and (B) the organoaluminum compound are explained in detail hereinafter.

As to the solid catalyst component (A), the reaction of a titanium compound of the formula (I), i.e. Ti(OR$^1$)$_s$X$_{4-s}$, with an organoaluminum compound of the formula (II), i.e. AlR$^2_t$Y$_{3-t}$, in the presence of an ether is explained first.

As the hydrocarbon residue R$^1$ having 1 to 20 carbon atoms in the titanium compound of the formula (I), there can be used aliphatic hydrocarbon groups such as alkyl and alkenyl groups, e.g., methyl, ethyl, n- and iso-propyl, n-, iso-, sec- and tert-butyl, n-, iso-, sec- and tert-amyl, neopentyl, hexyl, 2-ethylhexyl, heptyl, octyl, decyl, undecyl, dodecyl, tridecyl, tetradecyl, hexadecyl, octadecyl, allyl, etc., alicyclic hydrocarbon groups such as cyclohexyl, 2-methylcyclohexyl, cyclopentyl, etc., aromatic hydrocarbon groups such as phenyl, cresyl, xylyl, napthyl, etc. Among them, aliphatic hydrocarbon groups are preferable. It is possible to use titanium compounds having $OR^1$ groups of the formula (I) as a mixture thereof.

The halogen represented by "X" includes chlorine, bromine and iodine, and chlorine is more preferable. In the case of s being in the range of $0.5 \leq s \leq 2$, the titanium compound having the $OR^1$ groups can be obtained by either (1) reacting $Ti(OR^1)_4$ with titanium tetrachloride in necessary amounts, or (2) reacting titanium tetrachloride with an alcohol. Better results can be obtained when the titanium compound of the formula (I) is obtained by the process (2). In the case of s being in the range of $2 < s \leq 4$, the titanium compound of the formula (I) obtained by the process (1) can be used.

In the case of obtaining the reaction product from the titanium compound of the formula (I) and the organoaluminum compound of the formula (II) as a solid titanium component (a), $R^1$ being aliphatic hydrocarbon groups, particularly having 2 to 18 carbon atoms, is preferable. Further, $R^1$ being aliphatic hydrocarbon groups having 2 to 5 carbon atoms is more preferable. As to the value of "s", $0 < s \leq 3$ is preferable and $0 < s \leq 2$ is more preferable.

In the case of obtaining the reaction product from the titanium compound of the formula (I) and the organoaluminum compound of the formula (II) as a liquid material containing substantially no solid, $R^1$ being hydrocarbon residues, particularly having 6 to 20 carbon atoms, is preferable. As to the value of s, $0.5 \leq s \leq 4$ is preferable and $0.5 \leq s \leq 2$ is more preferable.

As the ethers, there can be used methyl propyl ether, methyl butyl ether, methyl amyl ether, methyl hexyl ether, diethyl ether, ethyl propyl ether, ethyl butyl ether, ethyl amyl ether, ethyl neopentyl ether, ethyl hexyl ether, dipropyl ether, propyl butyl ether, propyl amyl ether, dibutyl ether, diamyl ether, dihexyl ether, diheptyl ether, dioctyl ether, di-2-ethylhexyl ether, didecyl ether, didodecyl ether, ditridecyl ether, divinyl ether, bis(1-octenyl) ether, bis(1-decynyl) ether, ethyl phenyl ether, diphenyl ether, tetrahydrofuran, tetrahydropyran, phenyl vinyl ether, anisole, veratrole, m- or p-dimethoxyveratrole, ethylene glycol dimethyl ether, ethylene glycol diethyl ether, and the like. These hydrocarbon series ethers can be used alone or as a mixture thereof. Among these ethers, dialkyl ethers such as diethyl ether, dipropyl ether, dibutyl ether, diamyl ether, dihexyl ether, diheptyl ether, dioctyl ether, di-2-ethylhexyl ether, didecyl ether, didodecyl ether, and other ethers such as ethyl butyl ether, ethyl amyl ether, and ethyl hexyl ether are more preferable.

The amount of the ether to be reacted with the titanium compound of the formula (I) in the case of giving the solid titanium component (a) is 0.001 to 3 moles of the ether per mole of the titanium compound of the formula (I). In the case of using the solid titanium component (a) after separated, the amount of 0.01 to 1 mole of the ether per mole of the titanium compound of the formula (I) is preferable. In the case of using the solid titanium component (a) without separation but with addition of a tetravalent titanium halide with or without an ether to give a liquid material, the amount of 1 to 2 moles of the ether per mole of the titanium compound of the formula (I) is preferable. On the other hand, in the case of giving a liquid material containing substantially no solid, the amount of 2 to 5 moles of the ether per mole of the titanium of the formula (I) is preferable.

Whether or not the liquid material containing substantially no solid is obtained when the titanium compound of the formula (I) is reacted with the organoaluminum compound of the formula (II) in the presence of an ether depends on the kinds of the titanium compound, the ether compound, and the organoaluminum compound, to be used and molar ratios thereof. The liquid material is mainly formed in the following cases:

(1) The titanium compound of the formula (I) has as the $R^1$ a hydrocarbon residue having 6 to 20 carbon atoms and s being between 0.5 and 2 ($0.5 \leq s \leq 2$).
(2) The amount of ether is 2 to 5 moles per mole of the titanium compound of the formula (I).
(3) The amount of the organoaluminum compound of the formula (II) is 0.3 to 1.5 moles per mole of the titanium compound of the formula (I).
(4) The ether compound is a dialkyl ether. In these cases, when a solid is formed, the reaction can be continued by removing the solid and retaining only a liquid material.

On the other hand, the solid titanium component (a) can be formed mainly in the following cases:

(1) The titanium compound of the formula (I) has as the $R^1$ a hydrocarbon residue having 2 to 20 carbon atoms and s being more than zero and 3 or less ($0 < s \leq 3$), more preferably $R^1$ being a hydrocarbon residue having 2 to 5 carbon atoms, and s being more than zero and 2 or less ($0 < s \leq 2$).
(2) The amount of ether is 0.01 to 1 mole per mole of the titanium compound of the formula (I) in the case of using the solid titanium component (a) after separation, and 1 to 2 moles per mole of the titanium compound of the formula (I) in the case of using the solid titanium component (a) with addition of a tetravalent titanium halide, with or without an ether, without separation to give a liquid material.
(3) The amount of the organoaluminum compound of the formula (II) is 0.5 to 2.5 moles per mole of the titanium compound of the formula (I) in the case of using the solid titanium component (a) after separation, and 0.5 to 1.5 moles per mole of the titanium compound of the formula (I) in the case of using the solid titanium component (a) with addition of a tetravalent titanium halide, with or without an ether, without separation to give a liquid material.
(4) The ether compound is a dialkyl ether.

An explanation is given to the aluminum compound of the formula (II), i.e. $AlR^2_tY_{3-t}$. As the hydrocarbon residue $R^2$, that having 1 to 20 carbon atoms can be used. Examples of the hydrocarbon residue are methyl, ethyl, propyl, butyl, amyl, hexyl, heptyl, octyl, isoprenyl, and the like. Among them, aliphatic hydrocarbon groups having 1 to 10 carbon atoms are preferable.

As the halogen represented by "Y", there can be used chlorine, bromine and iodine. Among them, chlorine is preferable.

As to the value of "t", in the case of giving the solid titanium component (a), $0 < t \leq 3$ is usual, and $1 \leq t \leq 3$ is preferable. In the case of giving the liquid material containing substantially no solid, $0 < t < 3$ is preferable, and $1 \leq t < 3$ is more preferable.

The amount of the organoaluminum compound of the formula (II) in the reaction with the titanium compound of the formula (I) in the presence of an ether is usually 0.1 to 6 moles of the aluminum compound per mole of the titanium compound. In the case of giving the liquid material containing substantially no solid, the amount of preferably 0.2 to 5 moles, more preferably 0.3 to 1.5 moles, of the organoaluminum compound is used per mole of the titanium compound. On the other hand, in the case of using the solid titanium component (a) after separation, the amount of 0.5 to 2.5 moles of the organoaluminum compound per mole of the titanium compound is preferable. In the case of using the solid titanium component (a) with addition of a tetravalent titanium halide (or a tetravalent titanium halide and an ether) without separation, the amount of 0.5 to 1.5 moles of the organoaluminum compound per mole of the titanium compound is preferable.

The solid titanium component (a) can be synthesized by various methods from the titanium compound of the formula (I) and the organoaluminum compound of the formula (II) in the presence of an ether. For example, the solid titanium component (a) can be obtained by a process comprising reacting a titanium compound, an ether and an aluminum compound at the same time, a process comprising reacting a titanium compound with an ether first, and then reacting the resulting reaction product with an aluminum compound, a process comprising reacting an aluminum compound with an ether first and then reacting the resulting reaction product with a titanium compound or a reaction product of a titanium compound with an ether, and the like.

The solid titanium component (a) can be solubilized mainly by the following two methods. A first method comprises separating the solid titanium component (a), and reacting it with a component comprising a tetravalent titanium halide and an ether to give a liquid material, and a second method comprises adding a tetravalent titanium halide or a tetravalent titanium halide and an ether to the solid titanium component (a) produced without separation and reacting these components to give a liquid material. The catalyst prepared by using the first method can give a polymer having higher stereoregularity.

In the second method, the system producing the solid titanium component (a) comprises a liquid phase portion wherein a considerable amount of the ether initially charged is retained and a solid portion which is a titanium component containing a hydrocarbyloxy group, this being identified by analysis. This solid portion cannot be solubilized by an ether and can only be solubilized by the reaction with a tetravalent titanium halide or the reaction with a tetravalent titanium halide and an ether.

The separation of the solid titanium component (a) can be conducted by filtration followed by washing or by decantation. As the solvent for washing, there can be used purified inert hydrocarbon solvents such as aliphatic hydrocarbons, e.g. hexane, heptane, etc., alicyclic hydrocarbons, e.g. cyclohexane, methylcyclohexane, etc., aromatic hydrocarbons, e.g. benzene, toluene, xylene, etc.

As the tetravalent titanium halide used for solubilizing the solid titanium component (a), there can be used titanium tetrachloride, titanium tetrabromide, titanium tetraiodide, etc. These compounds can be used alone or as a mixture thereof. Among them, titanium tetrachloride is preferable.

As the ether used together with the tetravalent titanium halide for solubilizing the solid titanium component (a), the ethers mentioned above can be used. Among these ethers, aliphatic hydrocarbon series ethers are preferable.

An explanation is given to the reaction of the solid titanium component (a) with a tetravalent titanium halide or a tetravalent titanium halide and an ether.

The reaction can be carried out in an inert solvent or in the component of a tetravalent titanium halide or a tetravalent titanium halide and an ether. As the inert solvent, there can be used aliphatic hydrocarbons such as hexane, heptane, octane, etc., aromatic hydrocarbons such as benzene, toluene, xylene, etc., alicyclic hydrocarbons such as cyclohexane, methylcyclohexane, etc. Among them, the aromatic hydrocarbons are preferable and toluene is more preferable. The concentration of the tetravalent titanium halide is preferably 1 mole/liter or more.

As to the adding method of the reactants, there can be used a process for adding a tetravalent titanium halide or a tetravalent titanium halide added with an ether to the solid titanium component (a), a process for adding the solid titanium component (a) to a component of a tetravalent titanium halide or a tetravalent titanium halide added with an ether, and the like. The former method gives a preferable result.

The amount of the tetravalent titanium halide used for solubilizing the solid titanium component (a) is 0.05 to 10 moles, preferably 0.1 to 8 moles, more preferably 0.2 to 5 moles per mole of the solid titanium component (a) (based on the amount of titanium).

The amount of the ether to be added to the tetravalent titanium halide is 0.01 to 70 moles, preferably 0.1 to 50 moles, more preferably 0.2 to 40 moles per mole of the $R^1O$ group in the solid titanium component (a).

The temperature used for the solubilizing reaction is not limited but usually in the range of 10° to 100° C., preferably 30° to 80° C.

The solubilized titanium component, or a liquid material is subjected to a heat treatment at a temperature of 70° to 180° C., preferably 80° to 120° C., to give the solid catalyst component (A). The time required for the heat treatment is not limited but usually the heat treatment is conducted for from 10 minutes to 50 hours, preferably from 30 minutes to 30 hours.

On the other hand, when the liquid material is directly obtained from the reaction of the titanium compound of the formula (I) with the organoaluminum compound of the formula (II) in the presence of an ether, a tetravalent titanium halide is added to the liquid material and a heat treatment is conducted to give the solid catalyst component (A).

As the tetravalent titanium halide, there can be used titanium tetrachloride, titanium tetrabromide, titanium tetraiodide, etc. Among them, titanium tetrachloride is preferable. As to the adding method of such a tetravalent titanium halide, one method is to add a tetravalent titanium compound to the liquid material and another method is to add the liquid material to a tetravalent titanium halide. The tetravalent titanium halide can be used without dilution or with dilution with an inert solvent such as hexane, toluene, cyclohexane, etc.

The amount of the tetravalent titanium halide used for the deposition of the solid catalyst component (A) is preferably 0.1 to 50 moles, more preferably 0.5 to 30 moles, most preferably 1 to 20 moles per mole of the titanium compound of the formula (I) containing the $OR^1$ group. The temperature at the time of the addition is preferably in the range of 10° to 70° C.

After the addition of a tetravalent titanium halide, the temperature is raised to 40° to 150° C., preferably 80° to 120° C. and maintained at that temperature for a certain period of time to deposit the solid catalyst component (A). The time require for maintaining the temperature is usually from 5 minutes to 100 hours, preferably 10 minutes to 20 hours.

The solid catalyst component (A) thus obtained has about 5 mmole of titanium and about 0.05 to 0.5 mmole of the hydrocarbyloxy group in 1 gram of the solid catalyst component (A). When a catalyst containing such a solid catalyst component (A) is used, a polymer obtained has high stereoregularity and when hydrogen is used as a molecular weight modifier, polymerization activity is increased and stereoregularity of the resulting polymer is maintained at a high level, these being unexpected properties. It is not clear from where such properties are derived but the hydrocarbyloxy group seems to contribute to it. This can be derived from the facts that when the content of the hydrocarbyloxy group in the solid catalyst component (A) is below the range as mentioned above, the effect of this invention that the yield of a polymer or copolymer having high stereoregularity is increased can hardly be attained, while if the content is above the range as mentioned above, the feature of polymerization activity being high can hardly be attained.

The catalyst of this invention is obtained by combining the solid catalyst component (A) with an organoaluminum compound (B). As the organoaluminum compound (B), there can be used trialkylaluminums, dialkylaluminum halides, dialkylaluminum hydrides, alkylaluminum sesquihalides, monoalkylaluminum dihalides alone or as a mixture thereof. Among them, dialkylaluminum halides, and alkylaluminum sesquihalides are preferable. Concrete examples of these compounds are dimethylaluminum chloride, diethylaluminum chloride, di-n-propylaluminum chloride, diisopropylaluminum chloride, di-n-butylaluminum chloride, diisobutylaluminum chloride, dihexylaluminum chloride, dioctylaluminum chloride, and ethylaluminum sesquichloride. Further, it is also preferable to use the above-mentioned organoaluminum compound in combination with triethylaluminum, diethylaluminum hydride, diethylaluminum ethoxide, dimethylhydrosiloxy aluminum, methylethylhydrosiloxy aluminum, ethyl dimethylsiloxy aluminum, diethylaluminum isoprenyl or the like. Particularly preferable combination is with a dialkylaluminum chloride.

The amount of the organoaluminum compound (B) to be used is 0.05 to 1000 moles, preferably 0.1 to 200 moles, more preferably 1 to 100 moles per gram atom of the titanium in the solid catalyst component (A).

The catalyst of this invention is suitable for polymerization of olefins, particularly α-olefins, with high stereoregulating ability. More concretely, propylene, butene-1, pentene-1, 4-methylpentene-1, 3-methylbutene-1 and the like olefins can be polymerized alone stereoregularly, or these olefins can be copolymerized with ethylene or other olefins, or ethylene alone can be polymerized, or ethylene can be copolymerized with other olefins by using the catalyst of this invention.

In order to regulate the molecular weight of polymers, it is possible to add hydrogen, a halogenated hydrocarbon, or an organometallic compound which can easily bring about chain transfer to the polymerization system.

As the polymerization method, there can be used conventional suspension or slurry polymerization, bulk polymerization in a liquid monomer, vapor-phase polymerization, and solution polymerization.

In the case of suspension polymerization, the catalyst component is introduced into a reactor together with a polymerization solvent such as an aliphatic hydrocarbon, e.g. hexane, heptane, etc., an aromatic hydrocarbon, e.g. benzene, toluene, xylene, etc., an alicyclic hydrocarbon, e.g. cyclohexane, methylcyclohexane, etc., an olefin such as propylene or the like is introduced under pressure of 1 to 20 kg/cm$^2$ under an atmosphere of inert gas and polymerization is carried out at a temperature of room temperature to 150° C.

In the case of bulk polymerization, the catalyst is introduced into a reactor under the conditions that an olefin such as propylene can be liquid and polymerization of the olefin is carried out using the liquid olefin as a solvent. For example, in the case of propylene, polymerization can be carried out at room temperature to 90° C. under 10 to 45 kg/cm$^2$ in the liquid propylene.

In the case of vapor-phase polymerization, polymerization can be carried out under the conditions that an olefin such as propylene can be vapor in the substantial absence of a solvent under a pressure of 1 to 50 kg/cm$^2$ at a temperature of from room temperature to 120° C. and using a means in which the contact between the olefin and the catalyst becomes good such as a fluidized bed, a moving bed, or mixing with a stirrer.

This invention is illustrated by way of the following Examples. In the Examples, the term "extraction residue with boiling n-heptane" means the amount of residue in percentage after extracting a polymer with boiling n-heptane for 6 hours, and the melt index (MI) is measured at 230° C. under a load of 2.16 kg according to ASTM D-1238.

EXAMPLE 1

(i) Synthesis of solid catalyst component

In a reactor in which the air was replaced by nitrogen, 70 ml of n-heptane and 100 mmoles of butoxy titanium trichloride were placed and 50 mmoles of n-butyl ether was added dropwise at 30° C. with stirring. Subsequently, 95 mmoles of diethylaluminum chloride (a toluene solution, 1 mole/liter) was added dropwise in 1 hour at 60° C. and the solid produced was filtered, washed and dried to give a reddish brown solid. As a result of analysis, said solid had 1.3 mmoles of titanium and 1.2 mmoles of n-butoxy group per gram of the solid titanium component. X-ray diffraction pattern of said solid by copper K radiation showed no clear characteristic peak due to crystals of titanium trichloride.

Said solid titanium component in an amount of 4 g together with 10 mmoles of titanium tetrachloride, 10 ml of toluene and 10 mmole of di-n-butyl ether were placed in a reactor replaced by nitrogen and solubilized at 60° C. for 1 hour with magnetic stirring to give a dark brown liquid material. The liquid material was reacted at 100° C. for 4 hours with stirring to give a dark reddish violet solid. As a result of analysis, said solid had 5.0 mmoles of titanium and 0.43 mmoles of n-butoxy group per gram of the solid catalyst component.

(ii) Polymerization of propylene

The solid catalyst component obtained in (i) in an amount of 60 mg and 3.2 mmoles of diethylaluminum chloride together with 0.8 liter of n-hexane sufficiently deaerated and dehydrated were placed in an autoclave having a volume of 1.5 liters. While maintaining the inner temperature at 60° C., propylene was introduced into the autoclave under a pressure of 5 kg/cm$^2$ and hydrogen was also introduced into the autoclave so that a partial pressure of hydrogen became 0.2 kg/cm$^2$. Polymerization was carried out while maintaining the pressure at 4.8 kg/cm$^2$ gauge for 3 hours. As a result, a polymer insoluble in n-hexane was obtained in 187 g and a polymerized material soluble in hexane in 0.8 g. Extraction residue with boiling n-heptane of the polymer insoluble in n-hexane was 97.8% and the melt index was 3.5 g/10-min.

EXAMPLES 2 to 5

Using the compounds as listed in Table 1 in place of the compounds used in Example 1, individual solid catalyst components were synthesized in the same manner as described in Example 1. Using 60 mg of these solid catalyst components and 3.2 mmol of diethyl aluminum chloride in amounts as listed in Table 1 as catalyst, slurry polymerization of propylene was conducted in the same manner as described in Example 1 with the results as shown in Table 1.

EXAMPLE 6

In a reactor replaced by nitrogen, 90 ml of toluene and 100 mmoles of n-butoxy titanium trichloride were placed and 200 mmoles of di-n-amyl ether was added dropwise at 30° C. with stirring. Subsequently, 80 mmoles of triethylaluminum and 20 mmoles diethylaluminum chloride (a toluene solution, 1 mole/liter) were added dropwise in 1 hour and the reaction was carried out at 50° C. for 1 hour. The supernatant liquid of the resulting slurry had a di-n-amyl ether content of 0.77 mmole/liter.

To the slurry, 180 mmole of titanium tetrachloride was added dropwise at 40° C. in 1 hour with stirring and the reaction was continued for additional 1 hour to solubilize. Then, the solubilized liquid was heat treated at 90° C. for 1 hour followed by heat treatment at 110° C. for 1 hour to deposit a solid, which was filtered, washed and dried. The resulting solid catalyst component in an amount of 60 mg and 0.65 mmole of diethylaluminum chloride were used as catalyst for slurry polymerization of propylene in the same manner as described in Example 1. The results were shown in Table 1.

EXAMPLE 7

Using the same solid catalyst as used in Example 1, slurry polymerization of propylene was conducted in the same manner as described in Example 1 except for not using hydrogen as molecular weight modifier. The results were as shown in Table 1.

TABLE 1

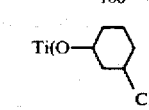

| | | Catalyst | | | | | |
|---|---|---|---|---|---|---|---|
| | | Synthesis of solid titanium component | | | | | Solubilizing reaction |
| | | Titanium | Ether | | Organo aluminum compound | | TiX$_4$ |
| Example No. | | Compound (mmole) | Compound (mmole) | Temp. (°C.) | Compound (mmole) | Temp. (°C.) | (X = halogen) (mmole) | Ether (mmole) |
| 1 | | Ti(O—n-Bu)Cl$_3$ 100 | n-Bu$_2$O 50 | 30 | AlEt$_2$Cl 95 | 60 | TiCl$_4$ 10 | n-Bu$_2$O 10 |
| 2 | | Ti(O—n-Pr)$_2$Cl$_2$ 100 | n-Oct$_2$O 50 | 30 | AlEt$_2$Cl 40 + AlEt$_3$ 40 | 60 | TiCl$_4$ 10 | n-Hex$_2$O 15 |
| 3 | | Ti(O—n-Bu)$_3$Cl 100 | n-Hex$_2$O 70 | 30 | AlEt$_2$Cl 100 | 70 | TiCl$_4$ 15 | n-Amyl$_2$O 20 |
| 4 | | Ti(O—cyclohexyl-CH$_3$)$_2$Cl$_2$ 100 | i-Amyl$_2$O 100 | 30 | AlEt$_2$Cl 120 | 50 | TiCl$_4$ 10 | n-Bu$_2$O 15 |
| 5 | | Ti(O—n-C$_{18}$H$_{37}$)Cl$_3$ 100 | n-Dod$_2$O 70 | 30 | AlEt$_2$Cl 30 + AlEt$_3$ 60 | 60 60 | TiCl$_4$ 10 | n-Oct$_2$O 10 |
| 6 | | Ti(O—n-Bu)Cl$_3$ 100 | n-Amyl$_2$O 200 | 30 | AlEt$_2$Cl 90 | 60 | TiCl$_4$ 200 | — |
| 7 | *1 (The same as Example 1) | | | | | | | |

| | | | Results of polymerization | | | | |
|---|---|---|---|---|---|---|---|
| Heat treatment | | Ti content in solid | Material soluble in | Polymer insoluble in n-hexane | | | Catalyst |
| Temp. (°C.) | Time (hrs) | catalyst (wt. %) | n-hexane (g) | Yield (g) | Extraction residue with n-heptane (%) | Melt index (g/10-min) | Component A efficiency (g-PP/g-solid . hr) |
| 100 | 4 | 24.4 | 0.8 | 187 | 97.8 | 3.5 | 1040 |
| 90 | 3 | 23.9 | 1.1 | 170 | 97.2 | 4.1 | 940 |
| 110 | 2 | 24.9 | 1.1 | 165 | 97.0 | 3.7 | 920 |
| 100 | 3 | 24.4 | 1.2 | 160 | 96.9 | 5.1 | 890 |
| 90 | 4 | 25.3 | 1.0 | 175 | 97.3 | 4.2 | 970 |
| 90 | 2 | 26.3 | 1.2 | 160 | 95.2 | 4.3 | 890 |

| TABLE 1-continued | | | | | |
|---|---|---|---|---|---|
| 24.4 | 0.7 | 125 | 97.6 | — | 690 |

(Note)
*1: The same catalyst as used in Example 1 was used.
Et = ethyl
n-Bu = n-butyl
n-Hex = n-hexyl
n-Oct = n-octyl
n-Pr = n-propyl
n-Dod = n-dodecyl
i-Amyl = isoamyl

EXAMPLE 8

Into a 1.5-liter autoclave sufficiently dried in vacuum and replaced by nitrogen, hydrogen was introduced until 1 kg/cm$^2$ and 350 g of liquefied propylene was also introduced. The inner temperature was maintained at 70° C. and the solid catalyst component synthesized in Example 1 in an amount of 10 mg and 2.5 mmole of diethylaluminum chloride were introduced into the autoclave. Polymerization was carried out at 70° C. for 4 hours with stirring to give 220 g of polypropylene powder. The catalyst efficiency was 22,000 g-PP/g-solid catalyst component and 90,200 g-PP/g-Ti (PP being abbreviation of polypropylene). Extraction residue with boiling n-heptane of the polymer was 97.8% and the melt index (MI) was 4.5 g/10-min. A Ti content of the polypropylene was about 11 ppm.

EXAMPLE 9

(i) Synthesis of liquid material

In a 500-ml reactor replaced by nitrogen, 100 mmole of titanium tetrachloride and 70 ml of toluene were placed. While maintaining the solution at 30° C., 100 mmole of n-dodecyl alcohol was added dropwise in 30 minutes and the reaction was continued at 30° C. for additional 2 hours with stirring. Subsequently, 250 mmole of n-butyl ether was added dropwise in 30 minutes. While maintaining the solution at 30° C., 90 ml of a toluene solution containing diethylaluminum chloride in a concentration of 1 mole/liter was added dropwise in 1 hour to give a uniform reddish black liquid material. This liquid material contained no precipitation.

(ii) Deposition of solid catalyst component

After adding 200 mmole of titanium tetrachloride to the uniform liquid material obtained in above (i), the temperature was raised to 100° C. and the reaction was carried out for 2 hours with strirring. After filtering, washing and drying, 18.3 g of dark violet solid was obtained. The content of n-dodecoxy group in the solid catalyst component was 0.45 mmole/gram-solid catalyst component and the titanium content was 5.3 mg atom/gram-solid catalyst component.

(iii) Polymerization of propylene

The solid catalyst component obtained in (ii) in an amount of 60 mg and 3.2 mmoles of diethylaluminum chloride together with 0.8 liter of hexane sufficiently deaerated and dehydrated were placed in an autoclave having a volume of 1.5 liters. While maintaining the inner temperature at 60° C., propylene was introduced into the autoclave under a pressure of 5.0 kg/cm$^2$ and hydrogen was also introduced into the autoclave so that a partial pressure of hydrogen became 0.2 kg/cm$^2$. Polymerization was carried out while maintaining the pressure at 4.8 kg/cm$^2$ gauge for 3 hours. As a result, a polymer insoluble in n-hexane was obtained in 194 g and a polymerized material soluble in n-hexane in 0.8 g. Catalyst efficiency was 1080 g-polypropylene (PP)/g.-solid catalyst component.hour. Extraction residue with boiling n-heptane of the polymer insoluble in n-hexane was 97.4% and the melt index (MI) was 3.7 g/10-min. These results are also listed in Table 2.

EXAMPLES 10 to 14

Using the compounds as listed in Table 2 in place of the compounds used in Example 9, individual solid catalyst components were synthesized in the same manner as described in Example 9. In Example 10, titanium tetra-2-ethylhexoxide and titanium tetrachloride were used and in Example 13, a mixture obtained by mixing titanium tetrabutoxide and titanium tetrachloride in the prescribed amounts in toluene at 30° C. was used. As the organoaluminum compounds, a mixture of trialkyl aluminum and dialkylaluminum chloride obtained at 30° C. was used in Examples 10 and 12.

Using these solid catalyst components in an amount of 60 mg and 3.2 mmole of diethylaluminum chloride, slurry polymerization of propylene was conducted in the same manner as described in Example 9 with the results as shown in Table 2.

EXAMPLE 15

Using the same catalyst as used in Example 9, polymerization of propylene was carried out in the same manner as described in Example 9 except for not introducing hydrogen into the autoclave. The results were as shown in Table 2.

EXAMPLE 16

Into a 1.5-liter autoclave sufficiently dried in vacuum and replaced by nitrogen, hydrogen was introduced until 1.5 kg/cm$^2$ and 350 g of liquefied propylene was introduced. The inner temperature was maintained at 70° C. and the solid catalyst component synthesized in Example 9 in an amount of 10 mg and 2.4 mmole of diethylaluminum chloride were introduced into the autoclave. Polymerization was carried out 70° C. for 4 hours with stirring to give 230 g of polypropylene. The catalyst efficiency was 5750 g-PP/g-solid catalyst component.hour. Extraction residue with boiling n-heptane of the polymer was 97.5% and the melt index was 4.0 g/10-min. A Ti content of the polypropylene was about 11 ppm. The results are also listed in Table 2.

TABLE 2

| Example No. | Synthesis of Ti(OR¹)ₛCl₄₋ₛ (A) molar ratio (mmole) | Solid catalyst component — Ether Compound | Ether mole/mole of A (mmole) | Ether Temp. (°C.) | Org.-Al compound | Org.-Al Compound mole/mole of A (mmole) | Org.-Al Temp. (°C.) | TiCl₄ mole/mole of A (mmole) | TiCl₄ Temp. × time | Solid catalyst component (mg) | Org.-Al AlEt₂Cl (mmole) | Polymerization conditions °C. × kg/cm² × hr (H₂ mole %) | Yield (g) | Material soluble in n-hexane (g) | Extraction residue with n-heptane of polymer insoluble in n-hexane (%) | Catalyst efficiency (g-PP/g-solid·hr) | MI (230° C.) (g/10 min) |
|---|---|---|---|---|---|---|---|---|---|---|---|---|---|---|---|---|---|
| 9 | TiCl₄ + n-Dod-OH 1:1 (100)(100) | n-Bu₂O | 2.5 (250) | 30 | AlEt₂Cl₁ | 0.9 (90) | 30 | 1.0 (100) | 100° C. × 2 hr | 60 | 3.2 | 60° C. × 5 × 3 hr (4) | 194 | 0.8 | 97.4 | 1080 | 3.7 |
| 10 | Ti(OEtHex)₄ + TiCl₄ 1:3 (25)(75) | i-Amyl₂O | 2.0 (200) | 30 | AlEt₂Cl + AlEt₃ 0.7 (70) 1:1 | | 30 | 1.5 (150) | 90° C. × 2 hr | " | " | 60° C. × 5 × 3 hr (4) | 177 | 1.1 | 96.6 | 980 | 4.1 |
| 11 | Ti(O-n-Stearyl)₄ (100) | n-Oct₂O | 2.0 (200) | 30 | Ali-Bu₂Cl₁ | 0.9 (90) | 30 | 4.0 (400) | 90° C. × 2 hr | " | " | 60° C. × 5 × 3 hr (4) | 166 | 1.0 | 96.3 | 920 | 3.8 |
| 12 | TiCl₄ + n-Dec-OH 1:1.5 (100)(150) | n-Hex₂O | 2.7 (270) | 30 | Ali-Bu₂Cl + Ali-Bu₃ 1:1 | 0.6 (60) | 30 | 2.0 (200) | 70° C. × 1 hr + 90° C. × 1 hr | " | " | 60° C. × 5 × 3 hr (4) | 188 | 0.8 | 97.2 | 1040 | 4.5 |
| 13 | TiCl₄ + Ti(O-n-Bu)₄ 7:1 (87.5)(12.5) | n-Amyl₂O | 2.5 (250) | 30 | AlMe₁.₅Cl₁.₅ | 1.2 (120) | 60 | 2.0 (200) | 110° C. × 2 hr | " | " | 60° C. × 5 × 3 hr (4) | 156 | 1.1 | 95.7 | 870 | 4.1 |
| 14 | TiCl₄ + n-Hex-OH 1:1 (100)(100) | n-Bu₂O | 2.5 (250) | 30 | AlEt₁.₅Cl₁.₅ | 1.2 (120) | 10 | 1.0 (100) | 90° C. × 2 hr | " | " | 60° C. × 5 × 3 hr (4) | 184 | 0.9 | 97.0 | 1020 | 4.0 |
| 15 | The same solid catalyst component as in Example 9 | — | — | — | — | — | — | — | — | " | " | 60° C. × 5 × 3 hr (0) | 130 | 1.0 | 97.6 | 720 | — |
| 16 | The same solid catalyst component as in Example 9 | — | — | — | — | — | — | — | — | 10 | 2.4 | 70° C. × Bulk × 4 hr (5) | 230 | — | 97.5 | 5750 | 4.0 |

Note
Me = methyl
n-Bu = n-butyl
n-Hex = n-hexyl
n-Dod = n-dodecyl
Et = ethyl
i-Bu = isobutyl
n-Oct = n-octyl
n-Dec = n-decyl

EXAMPLE 17

In a reactor replaced by nitrogen, 90 ml of n-heptane and 100 mmole of n-butoxy titanium trichloride were placed. While maintaining at 30° C., 150 mmole of di-n-butyl ether was added dropwise with stirring and subsequently, 90 mmole of diethylaluminum chloride (a n-heptane solution, 1 mole/liter) was added dropwise in 1 hour and the reaction was carried out at 60° C. for 1 hour. To the resulting slurry, a mixture obtained by mixing 150 mmole of titanium tetrachloride and 50 mmole of di-isoamyl ether at 30° C. was added dropwise at 30° C. with stirring in 1 hour. The reaction was continued for additional 1 hour to solubilize the solid titanium component. Thereafter, heat treatment was carried out at 100° C. for 2 hours to deposit a solid, which was filtered, washed and dried.

The resulting solid catalyst component in an amount of 60 mg and 3.2 mmole of diethylaluminum chloride were used as catalyst for slurry polymerization of propylene in the same manner as described in Example 1. As a result, a polymer insoluble in n-hexane was obtained in 167 g and a polymerized material soluble in n-hexane in 0.9 g. Extraction residue with boiling n-heptane of the polymer insoluble in n-hexane was 95.7% and the melt index was 3.1 g/10-min.

EXAMPLE 18

In an autoclave having a volume of 1.5 liters and dried in vacuum and replaced by nitrogen, 100 mg of the solid catalyst component synthesized in Example 1 and 1.2 mmoles of triethyl aluminum together with 0.8 liter of n-hexane dehydrated and deaerated were placed. While maintaining the inner temperature at 80° C., hydrogen was charged until 1.6 kg/cm$^2$. Polymerization of ethylene was carried out for 1 hour while supplementing ethylene so as to maintain the total pressure at 4.0 kg/cm$^2$ gauge. As a result, 155 g of white polymer was obtained.

EXAMPLE 19

In an autoclave having a volune of 1.5 liters and dried in vacuum and replaced by nitrogen, 100 mg of the solid catalyst component synthesized in Example 9 and 1.2 mmoles of triethylaluminum together with 0.8 liter of n-hexane dehydrated and deaerated were placed. While maintaining the inner temperature at 80° C., hydrogen was charged until 1.6 kg/cm$^2$. Polymerization of ethylene was carried out for 1 hour while supplementing ethylene so as to maintain the total pressure at 4.0 kg/cm$^2$ gauge. As a result, 160 g of white polymer was obtained.

EXAMPLE 20

Using 60 mg of the solid catalyst component obtained in Example 1 and 3.2 mmole of diethylaluminum bromide in place of diethylaluminum chloride together with 0.8 liter of n-hexane sufficiently deaerated and dehydrated, slurry polymerization of propylene was carried out in the same manner as described in Example 1. As a result, 157 g of a polymer insoluble in n-hexane was obtained together with 1.0 g of a polymerized material soluble in n-hexane. Extraction residue with boiling n-heptane of the polymer insoluble in n-hexane was 96.3% and the melt index was 5.1 g/10-min.

EXAMPLE 21

Using 60 mg of the solid catalyst component obtained in Example 1 and 3.2 mmole of diethylaluminum iodide in place of diethylaluminum chloride together with 0.8 liter of n-hexane sufficiently deaerated and dehydrated, slurry polymerization of propylene was carried out in the same manner as described in Example 1. As a result, 153 g of a polymer insoluble in hexane was obtained together with 1.2 g of a polymerized material soluble in hexane. Extraction residue with boiling n-heptane of the polymer insoluble in n-hexane was 96.6% and the melt index was 3.8 g/10-min.

EXAMPLE 22

Using 500 mg of the solid catalyst component obtained in Example 1 and 3.0 mmole of diethylaluminum chloride, polymerization of butene-1 was carried out in the same manner as described in Example 1 to give 76 g of white polymer.

EXAMPLE 23

Using 500 mg of the solid catalyst component obtained in Example 9 and 3.2 mmole of diethylaluminum chloride, polymerization of butene-1 was carried out in the same manner as described in Example 1 to give 90 g of white polymer.

EXAMPLE 24

Using 500 mg of the solid catalyst component obtained in Example 1 and 3.0 mmole of diethylaluminum chloride, polymerization of 4-methylpentene-1 was carried out in the same manner as described in Example 1 to give 36 g of white polymer.

EXAMPLE 25

Using 1000 mg of the solid catalyst component obtained in Example 9 and 5.0 mmole of diethylaluminum chloride, polymerization of 4-methylpentene-1 was carried out in the same manner as described in Example 1 to give 70 g of white polymer.

EXAMPLE 26

Using 60 mg of the solid catalyst component obtained in Example 1 and 1.0 mmole of diethylaluminum chloride, copolymerization of propylene and ethylene was carried out in the same manner as described in Example 1 except for using a mixed gas of propylene and ethylene containing 2% by mole of ethylene in place of propylene to give 190 g of white copolymer.

EXAMPLE 27

Using 60 mg of the solid catalyst component obtained in Example 9 and 3.2 mmole of diethylaluminum chloride, copolymerization of propylene and ethylene was carried out in the same manner as described in Example 1 except for using a mixed gas of propylene and ethylene containing 2% by mole of ethylene in place of propylene to give 190 g of white copolymer.

What is claimed is:

1. A catalyst for polymerization of olefins comprising (A) a solid catalyst component obtained by reacting a titanium compound with an organoaluminum compound in the presence of an ether and a hydrocarbon solvent followed by heat treatment and (B) an organoaluminum compound, characterized in that said solid catalyst component has a hydrocarbyloxy group and is obtained by reacting a titanium compound of the formula $$Ti(OR^1)_s X_{4-s} \quad (I)$$

wherein $R^1$ is a hydrocarbon residue having 1 to 20 carbon atoms; X is a halogen atom; and $0 < s \leq 4$, with an organoaluminum compound of the formula:

$$AlR^2_t Y_{3-t} \quad (II)$$

wherein $R^2$ is a hydrocarbon residue having 1 to 20 carbon atoms; Y is a halogen atom; and $0 < t \leq 3$, in the presence of an ether and a hydrocarbon solvent to give a liquid material containing substantially no solid, or to give a solid titanium component (a), which is changed to a liquid material by adding a tetravalent titanium halide or a tetravalent titanium halide and an ether, or which is separated from the reaction mixture and then a tetravalent titanium halide and an ether are added thereto to give a liquid material, and heat treating said liquid material at a temperature of 70° to 180° C. with addition of a tetravalent titanium halide or without addition of a tetravalent titanium halide to give the solid catalyst component.

2. A catalyst according to claim 1, wherein the solid catalyst component is obtained by reacting 1 mole of a titanium compound of the formula:

$$Ti(OR^1)_s X_{4-s} \quad (I)$$

wherein $R^1$ is a hydrocarbon residue having 6 to 20 carbon atoms; X is a halogen atom; and $0.5 \leq s \leq 2$, with 0.3 to 1.5 moles of an organoaluminum compound of the formula:

$$AlR^2_t Y_{3-t} \quad (II)$$

wherein $R^2$ is a hydrocarbon residue having 1 to 20 carbon atoms; Y is a halogen atom; and $1 \leq t < 3$, in the presence of 2 to 5 moles of an ether and a hydrocarbon solvent to give a liquid material containing substantially no solid, and heat treating the liquid material with addition of a tetravalent titanium halide to deposit the solid catalyst component.

3. A catalyst according to claim 1, wherein the solid catalyst component is obtained by reacting 1 mole of a titanium compound of the formula:

$$Ti(OR^1)_s X_{4-s} \quad (I)$$

wherein $R^1$ is a hydrocarbon residue having 2 to 20 carbon atoms; X is a halogen atom; and $0 < s \leq 3$, with 0.5 to 1.5 moles of an organoaluminum compound of the formula:

$$AlR^2_t Y_{3-t} \quad (II)$$

wherein $R^2$ is a hydrocarbon residue having 1 to 20 carbon atoms; Y is a halogen atom; and $1 < t \leq 3$, in the presence of 1 to 2 moles of an ether and a hydrocarbon solvent to give a solid titanium component (a), which is solubilized by addition of a tetravalent titanium halide with or without an ether without separation to give a liquid material, and heat treating the liquid material at a temperature of 70° to 180° C. to give the solid catalyst component.

4. A catalyst according to claim 1, wherein the solid catalyst component is obtained by reacting 1 mole of a titanium compound of the formula:

$$Ti(OR^1)_s X_{4-s} \quad (I)$$

wherein $R^1$ is a hydrocarbon residue having 2 to 20 carbon atoms; X is a halogen atom; and $0 < s \leq 3$, with 0.5 to 2.5 moles of an organoaluminum compound of the formula:

$$AlR^2_t Y_{3-t} \quad (II)$$

wherein $R^2$ is a hydrocarbon residue having 1 to 20 carbon atoms; Y is a halogen atom; and $1 \leq t \leq 3$, in the presence of 0.01 to 1 mole of an ether and a hydrocarbon solvent to give a solid titanium component (a), which is separated from the reaction mixture and a tetravalent titanium halide and an ether are added to the solid titanium component (a) separated to give a liquid material by solubilization, heat treating the liquid material at a temperature of 70° to 180° C. to give the solid catalyst component.

5. A catalyst according to claim 1, 2, 3 or 4, wherein X in the formula (I) is chlorine.

6. A catalyst according to claim 1, 2, 3 or 4, wherein the titanium compound of the formula:

$$Ti(OR^1)_s X_{4-s} \quad (I)$$

wherein $R^1$ is a hydrocarbon residue having 6 to 20 carbon atoms; X is chlorine; and $0 < s \leq 2$, is obtained by reacting titanium tetrachloride with an aliphatic alcohol having 6 to 20 carbon atoms.

7. A catalyst according to claim 1, 2, 3 or 4, wherein the ether used in the reaction of the titanium compound of the formula (I) with the organoaluminum compound of the formula (II) is a dialkyl ether.

8. A catalyst according to claim 1, 2, 3 or 4, wherein said hydrocarbon solvent is an aromatic hydrocarbon.

9. A catalyst according to claim 1, 2, 3, or 4, wherein the aromatic hydrocarbon is toluene.

10. A catalyst according to claim 1, 3, or 4 wherein the tetravalent titanium halide used for solubilizing the solid titanium component (a) is titanium tetrachloride.

11. A catalyst according to claim 1, 3 or 4, wherein the amount of tetravalent titanium halide used for solubilizing the solid titanium component (a) is 0.1 to 8 moles per mole of the titanium in the solid titanium component.

12. A catalyst according to claim 1, 3 or 4, wherein the ether used together with the tetravalent titanium halide for solubilizing the solid titanium component is an aliphatic hydrocarbon series ether.

13. A catalyst according to claim 1, 3 or 4, wherein the amount of the ether used together with the tetravalent titanium halide for solubilizing the solid titanium component is 0.1 to 50 moles per mole of the hydrocarbyloxy group in the solid titanium component.

14. A catalyst according to claim 1, 2, 3 or 4, wherein the tetravalent titanium halide added in the heat treatment is titanium tetrachloride.

15. A catalyst according to claim 1, 2, 3 or 4, wherein the heat treatment is carried out at a temperature of 80° to 120° C.

16. A catalyst according to claim 1, 2, 3 or 4, wherein the organoaluminum compound (B) is a dialkylaluminum chloride.

17. A catalyst according to claim 1, 2, 3 or 4, wherein the amount of the organoaluminum compound (B) is 1 to 100 moles per gram atom of the titanium in the solid catalyst component (A).

* * * * *